(12) United States Patent
Sawasato et al.

(10) Patent No.: US 8,258,236 B2
(45) Date of Patent: Sep. 4, 2012

(54) TUBULAR FORMING MATERIAL AND ITS HEAT-SHRINKABLE FILM

(75) Inventors: Tadashi Sawasato, Ichihara (JP); Eiji Sato, Ichihara (JP); Hideki Toya, Ichihara (JP); Hitoshi Nakazawa, Ichihara (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/521,188

(22) PCT Filed: Dec. 21, 2007

(86) PCT No.: PCT/JP2007/074736
§ 371 (c)(1),
(2), (4) Date: Jul. 24, 2009

(87) PCT Pub. No.: WO2008/078710
PCT Pub. Date: Jul. 3, 2008

(65) Prior Publication Data
US 2010/0022711 A1    Jan. 28, 2010

(30) Foreign Application Priority Data
Dec. 26, 2006 (JP) .................. 2006-349932

(51) Int. Cl.
C08F 297/04 (2006.01)
C08J 5/18 (2006.01)
C08L 53/02 (2006.01)
(52) U.S. Cl. .......................... 525/89; 525/98
(58) Field of Classification Search .................... 525/89, 525/98
See application file for complete search history.

(56) References Cited

U.S. PATENT DOCUMENTS

| | | | |
|---|---|---|---|
| 6,841,261 B2 | 1/2005 | Matsui et al. | |
| 2004/0102576 A1 | 5/2004 | Matsui et al. | |
| 2006/0233984 A1 | 10/2006 | Suzuki et al. | |
| 2007/0196604 A1* | 8/2007 | Kurokawa et al. | 428/34.9 |

FOREIGN PATENT DOCUMENTS

| | | | |
|---|---|---|---|
| CN | 1471546 A | | 1/2004 |
| EP | 0 852 240 A1 | | 7/1998 |
| EP | 1645588 | * | 4/2006 |
| JP | 50 6673 | | 1/1975 |
| JP | 59 184620 | | 10/1984 |
| JP | 7 216186 | | 8/1995 |
| JP | 2002 137292 | | 5/2002 |
| JP | 2003 155356 | | 5/2003 |
| JP | 2007 301985 | | 11/2007 |
| WO | 02 38642 | | 5/2002 |
| WO | 2004 033541 | | 4/2004 |
| WO | WO 2006/075665 A1 | | 7/2006 |

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

The present invention relates to tubular forming material made of a composition comprising block copolymers each made of a vinyl aromatic hydrocarbon and a conjugated diene, which has a uniaxial elongation viscosity at 88° C. at a strain rate of 0.5 sec−1 satisfying the following formula between 1.0 sec and 2.8 sec after initiation of elongation, $$0.25 < (\mathrm{LOG}\, \eta 2.8 - \mathrm{LOG}\, \eta 1.0)/(2.8-1.0) < 0.4$$

wherein η1.0 and η2.8 represent uniaxial elongation viscosities (Pa·sec) at elongation times of 1.0 sec and 2.8 sec, respectively, when measured by a Meissner model elongation viscometer. The composition contains three block copolymers at a specified blend ratio.

4 Claims, No Drawings

TUBULAR FORMING MATERIAL AND ITS HEAT-SHRINKABLE FILM

TECHNICAL FIELD

The present invention relates to a tubular forming material and a heat-shrinkable film using it.

BACKGROUND ART

Heretofore, polyvinyl chloride was used for a heat-shrinkable film for e.g. a shrink package, but in recent years, a block copolymer made of a vinyl aromatic hydrocarbon and a conjugated diene or its resin composition has been used. There are various processes for producing the heat-shrinkable film, and as the simplest process, a production process called tubular method may be mentioned.

Patent Document 1 discloses that beyond expectation, it is extremely difficult to produce a heat-shrinkable film by using the above block copolymer made of a vinyl aromatic hydrocarbon and a conjugated diene or its resin composition by means of a tubular method, and the temperature control in a stretching step is to be precisely carried out so as to stabilize forming. On the other hand, Patent Document 2 discloses that some kinds of block copolymers made of a vinyl aromatic hydrocarbon and a conjugated diene are suitable for the tubular method.

The tubular method is a process for producing a heat-shrinkable film by extruding a molten resin from a ring-shaped die to obtain a tube, controlling the tube at a proper temperature, and then injecting air into the tube so as to expand it (hereinafter referred to as "bubble formation") for stretching in a direction perpendicular to the flow direction of the film. A power required for stretching the film by the bubble formation can be determined from the difference between the outside pressure of the bubble and the inside pressure for forming the bubble by the injection of the air into the tube.

Specifically, compressed air is injected into the above expanded tube by a needle to form a bubble, a cooling temperature of the bubble is controlled or the position of a pinch roll for pinching the downstream side of the bubble is further adjusted, whereby the internal pressure of the bubble is adjusted so as to stabilize the bubble. However, the tube is continuously extruded, therefore there is a case where the thickness or diameter of the tube slightly changes and further the resin temperature slightly changes with time (hereinafter generally referred to as "variable factors in production"), whereby abnormal expansion (hereinafter referred to as "excess expansion") or the like locally occurs at the time of bubble formation, and therefore it will be difficult to stably produce the film.

In order to prevent the occurrence of the excess expansion, it has been desired to develop a material which is less influenced by the variable factors in production while it is not so much required to seriously control e.g. the amount of air to be injected or the resin temperature.

Patent Document 1: JP-A-50-6673
Patent Document 2: JP-A-07-216186

DISCLOSURE OF THE INVENTION

Object to be Accomplished by the Invention

It is an object of the present invention to provide a tubular forming material excellent in bubble formation stability in production of a heat-shrinkable film, and particularly it is an object of the present invention to provide a tubular forming material using a block copolymer made of a vinyl aromatic hydrocarbon and a conjugated diene.

Means to Accomplish the Object

The present inventors have conducted extensive studies to accomplish the above object, and as a result, have found that excess expansion hardly occurs during bubble formation in the production of a heat-shrinkable film by using a tubular forming material characterized in that in its uniaxial elongation viscosity curve prepared by plotting the values obtained by measurement under specific conditions, the inclination during a specific elongation time is within a specific range. The present invention has been accomplished on the basis of this discovery.

Namely, the present invention provides the following.

(1) A tubular forming material made of a composition comprising block copolymers each made of a vinyl aromatic hydrocarbon and a conjugated diene, which has a uniaxial elongation viscosity at 88° C. at a strain rate of 0.5 sec$^{-1}$ satisfying the following formula between 1.0 sec and 2.8 sec after initiation of elongation, $$0.25<(\text{LOG } \eta_{2.8}-\text{LOG } \eta_{1.0})/(2.8-1.0)<0.4$$

wherein $\eta_{1.0}$ and $\eta_{2.8}$ represent uniaxial elongation viscosities (Pa·sec) at elongation times of 1.0 sec and 2.8 sec, respectively, when measured by a Meissner model elongation viscometer.

(2) The tubular forming material according to (1), wherein the uniaxial elongation viscosity at 88° C. at a strain rate of 0.5 sec$^{-1}$ satisfies the following formula between 1.0 sec and 2.8 sec after initiation of elongation, $$0.3<(\text{LOG } \eta_{2.8}-\text{LOG } \eta_{1.0})/(2.8-1.0)<0.4.$$

(3) The tubular forming material according to (1) or (2), wherein the above composition comprises the following block copolymer (i), block copolymer (ii) and block copolymer (iii), and their blend ratio (mass % ratio) of (i)/(ii)/(iii) is 20 to 40/20 to 40/20 to 40, (i) a block copolymer which is a block copolymer made of a vinyl aromatic hydrocarbon and a conjugated diene, which satisfies the following (a) and (b), (a) it has two tapered block portions in which the constitution ratio, in monomer units, of the vinyl aromatic hydrocarbon to the conjugated diene continuously changes, and in a case where one of the two tapered block portions is represented as T1 and the other tapered block portion is represented as T2, the compositional ratio (mass %) of the vinyl aromatic hydrocarbon to the conjugated diene occupied in each tapered block portion, is 75 to 95/5 to 25 in T1 and 60 to 95/5 to 40 in T2, (b) at least one terminal block portion of the block copolymer is a block portion containing the vinyl aromatic hydrocarbon in an amount of at least 95 mass %, (ii) a block copolymer which is a block copolymer made of a vinyl aromatic hydrocarbon and a conjugated diene, which satisfies the following (c), (d) and (e):

(c) it has at least one random block portion in which the constitution ratio, in monomer units, of the vinyl aromatic hydrocarbon to the conjugated diene is uniform, and further the ratio of the vinyl aromatic hydrocarbon to the conjugated diene in the random block portion is 60 to 95/5 to 40, (d) at least one terminal of the block copolymer has a block portion containing at least 95 mass % of the vinyl aromatic hydrocarbon, and the total amount of such a block portion is from 1 to 30 mass % based on the total amount of the block copolymer, and (e) it has a block portion made solely of the conjugated diene, and the content proportion of such a block portion is from 5 to 14 mass % based on the total of a block copolymer, (iii) a block copolymer which is a block copolymer made of a vinyl aromatic hydrocarbon and a conjugated diene, which satisfies the following (f), (g) and (h):

(f) it has at least one random block portion in which the constitution ratio, in monomer units, of the vinyl aromatic hydrocarbon to the conjugated diene is uniform, and further the ratio of the vinyl aromatic hydrocarbon to the conjugated diene in the random block portion is 60 to 95/5 to 40 mass % ratio, (g) at least one terminal of the block copolymer has a block portion containing at least 95 mass % of the vinyl aromatic hydrocarbon, and the total amount of such a block portion is from 1 to 30 mass % based on the total amount of the block portion, and (h) it has a block portion made solely of the conjugated diene, and the content proportion of such a block portion is from 15 to 35 mass % based on the total of a block copolymer.

(4) The tubular forming material according to (3), wherein the blend ratio (mass % ratio) of (i)/(ii)/(iii) is 25 to 35/25 to 35/25 to 35.

(5) A heat-shrinkable film using the tubular forming material as defined in (1) or (2).

Effect of the Invention

By using the tubular forming material of the present invention, it is possible to produce an excellent heat-shrinkable film since bubble formation in the stretching step becomes stable at the time of producing the heat-shrinkable film by means of a tubular method. For example, bubble formation becomes remarkably stable as compared with the case of using the resin composition in Patent Document 2, and further stable bubble formation is achieved without requiring a delicate control of a temperature as in Patent Document 1.

BEST MODE FOR CARRYING OUT THE INVENTION

For the tubular forming material of the present invention, it is essential that its uniaxial elongation viscosity ($\eta$) measured by a Meissner model elongation viscometer as mentioned below, satisfies the following formula between 1.0 sec and 2.8 sec after initiation of elongation at 88° C. at a strain rate of 0.5 $\sec^{-1}$, $$0.25 < (\mathrm{LOG}\ \eta_{2.8} - \mathrm{LOG}\ \eta_{1.0})/(2.8-1.0) < 0.4$$

wherein $\eta_{1.0}$(Pa·sec) represents the uniaxial elongation viscosity at an elongation time of 1.0 sec, and $\eta_{2.8}$(Pa·sec) represents an uniaxial elongation viscosity at an elongation time of 2.8 sec.

Namely, (LOG $\eta_{2.8}$ – LOG $\eta_{1.0}$)/(2.8–1.0) represents the inclination of the linear line connecting the two points on the uniaxial elongation viscosity curve obtained by taking common logarithm of the uniaxial elongation viscosity on the ordinary axis and the elongation time on the abscissa axis, and a material of which this inclination in the viscosity is within a range of from 0.25 to 0.4 is suitable for a tubular forming material.

The inclination being large means that a strong power is necessary for stretching the film, and as a result, the tube does not tend to be excessively expanded and the bubble formation will be stable, such being preferred. However, if the inclination exceeds 0.5, it will be difficult to expand the bubble as such, namely, it becomes difficult to stretch the film up to a desired stretching ratio. On the contrary, if the inclination is lower than 0.25, in a case where the internal pressure of the tube is increased so as to increase the stretching ratio, the variable factors in manufacturing tend to be influential, whereby the tube tends to be excessively expanded.

Accordingly, the tube is likely to burst, or the tube is likely to be inflated to the outside of a cooling ring for fixing size, and creases are thus likely to be formed on the heat-shrinkable film obtained, whereby it becomes difficult to produce a heat-shrinkable film. Such inclination is preferably from 0.27 to 0.4, more preferably from 0.3 to 0.4.

It is possible to increase the above inclination by increasing the proportion of a vinyl aromatic hydrocarbon in a block copolymer made of the vinyl aromatic hydrocarbon and a conjugated diene or in its resin composition, but the glass transition temperature increases at the same time, whereby the film is likely to rupture due to deterioration of the stretchability or deterioration of the flexibility of the film, and therefore it is difficult to stabilize the bubble only by changing the proportion of the vinyl aromatic hydrocarbon. On the other hand, if the proportion of the conjugated diene in the block copolymer or its resin composition is increased, such inclination tends to be too small, whereby excess expansion of the tube frequently occurs, and therefore the bubble formation becomes unstable.

Further, in the present invention, the reason that the conditions for measurement of the uniaxial elongation viscosity of the tubular forming material are set at a temperature of 88° C. and at a strain rate of 0.5 $\sec^{-1}$, is as follows.

The temperature is preferably such a high temperature of at least 70° C. as a suitable temperature for stretching a block copolymer film made of a vinyl aromatic hydrocarbon and a conjugated diene. If it exceeds 90° C., films are hot-welded with one another in a water bath. Therefore in such a range, the temperature of 88° C. was selected since a higher temperature is suitable for stable tubular film formation.

Further, regarding the strain rate, 0.5 $\sec^{-1}$ was selected from the viewpoint of the time required for TD stretching and TD stretching ratio, within the range of real productivity by means of tubular film formation.

In order that the above inclination is within the specific range, it is preferred that the tubular forming material contains the following composition of block copolymers. The block copolymer composition comprises the following block copolymer (i), block copolymer (ii) and block polymer (iii), and their composition ratio (mass %) of (i)/(ii)/(iii) is preferably 20 to 40/20 to 40/20 to 40, particularly preferably 25 to 35/25 to 35/25 to 35.

(i) A block copolymer which is a block copolymer made of a vinyl aromatic hydrocarbon and a conjugated diene, which satisfies the following (a) and (b).

(a) It has two tapered block portions in which the constitution ratio, in monomer units, of the vinyl aromatic hydrocarbon to the conjugated diene continuously changes, and in a case where one of the two tapered block portions is represented as T1 and the other tapered block portion is represented as T2, the compositional ratio (mass %) of the vinyl aromatic hydrocarbon to the conjugated diene occupied in each tapered block portion, is 75 to 95/5 to 25 in T1 and 60 to 95/5 to 40 in T2, more preferably 80 to 90/10 to 20 in T1 and 65 to 75/25 to 35 in T2, (b) at least one terminal block portion of the block copolymer is a block portion (hereinafter referred to as "S1" in the case of one block portion, and "S1" and "S2" in the case of two block portions) containing the vinyl aromatic hydrocarbon in an amount of at least 95 mass %, preferably at least 97 mass %.

(ii) A block copolymer which is a block copolymer made of a vinyl aromatic hydrocarbon and a conjugated diene, which satisfies the following (c), (d) and (e):

(c) It has at least one random block portion (hereinafter referred to as "R1") in which the constitution ratio, in monomer units, of the vinyl aromatic hydrocarbon to the conjugated diene is uniform, and further the composition ratio (mass %) of the vinyl aromatic hydrocarbon to the conjugated diene in the R1 is 60 to 95/5 to 40, preferably 75 to 95/5 to 25, (d) at least one terminal of the block copolymer has a block portion (S1 and/or S2) containing at least 95 mass % of the vinyl aromatic hydrocarbon, and the content ratio of the block portion is from 1 to 30 mass %, preferably from 1 to 27 mass % based on the total amount of the block copolymer, and (e) it has a block portion (hereinafter referred to as "B1") made solely of the conjugated diene, and the content proportion of the B1 is from 5 to 14 mass %, preferably from 7 to 12 mass % based on the total block copolymer, (iii) A block copolymer which is a block copolymer made of a vinyl aromatic hydrocarbon and a conjugated diene, which satisfies the following (f), (g) and (h), (f) it has at least one random block portion (hereinafter referred to as "R1") in which the constitution ratio, in monomer units, of the vinyl aromatic hydrocarbon to the conjugated diene is uniform, and further the composition ratio (mass %) of the vinyl aromatic hydrocarbon to the conjugated diene in the R1 is from 60 to 95/5 to 40, preferably 80 to 95/5 to 20, (g) at least one terminal of the block copolymer has a block portion (S1 and/or S2) containing at least 95 mass %, preferably at least 97 mass % of the vinyl aromatic hydrocarbon, and the content proportion of such a block portion is from 1 to 30 mass %, preferably from 1 to 20 mass % based on the total amount of the block copolymer, and (h) it has a block portion (hereinafter referred to as "B1") made solely of the conjugated diene, and the content proportion of the B1 is from 15 to 35 mass %, preferably from 15 to 30 mass %, based on the total amount of the block copolymer.

The block copolymer (i) has optimum rigidity and elongation for forming a tubular, and has the physical property balance excellent in the anti-natural shrinkage by making the difference in the constitution ratio of the vinyl aromatic hydrocarbon to the conjugated diene in T1 and T2, and particularly it becomes optimum especially in the case of the above range of (a). If the proportion of the vinyl aromatic hydrocarbon in each tapered block is less than 75% in T1 and less than 60% in T2, the rigidity deteriorates and the bubble formation stability deteriorates. Further, if the proportion of the vinyl aromatic hydrocarbon exceeds 95% in both of T1 and T2, the elongation will be deteriorated, whereby the film is likely to rupture.

In the composition ratio of the vinyl aromatic hydrocarbon to the conjugated diene in R1 of the block copolymer (ii) and block copolymer (iii), the rigidity deteriorates and bubble formation becomes unstable if the proportion of the vinyl aromatic hydrocarbon becomes less than 60 mass %, and if the proportion of the vinyl aromatic hydrocarbon exceeds 95 mass %, the strength deteriorates, the film rupture readily occurs, and further there is a possibility that the heat-shrinkable obtainable is unpractical.

Further, each of the block copolymer (ii) and the bock copolymer (iii) has at least one block portion containing at least 5 mass % of the vinyl aromatic hydrocarbon, but if the proportion of the block portion in the case of one block portion (S1 or S2) or the proportion of the total amount of the block portions in the case of two block portions (S1 and S2) exceeds 30 mass % in the block copolymer, the glass transition temperature 1 5 increases, and the film easily breaks.

Further, each of the block copolymer (ii) and the block copolymer (iii) also has the block portion (B1) made of a conjugated diene, and if such a proportion is from 8 to 14 mass % in the block copolymer, the strength becomes insufficient though the rigidity is excellent, and further if the proportion is from 15 to 35 mass %, the rigidity is insufficient though the strength is excellent. In the case of using one type of a block copolymer, it is difficult to develop physical properties excellent in both of the strength and the rigidity, but in the case of using two block copolymers having different proportions of B1 in the block copolymer in combination, the physical properties excellent in both of the rigidity and the strength are developed and the stretchability are improved. Namely, the block copolymer (ii) has a proportion of B1 being 5 to 14 mass % in the block copolymer, and the block copolymer (iii) has a proportion of B1 being 15 to 35 mass % in the block copolymer.

The vinyl aromatic hydrocarbon to be used for production of a block copolymer may, for example, be styrene, o-methylstyrene, p-methylstyrene, p-tert-butylstyrene, 2,4-dimethylstyrene, 2,5-dimethylstyrene, α-methylstyrene, vinyl naphthalene or vinyl anthracene, and particularly styrene may generally be mentioned.

The conjugated diene to be used for production of the block copolymer to be used in the present invention may, for example, be 1,3-butadiene, 2-methyl-1,3-butadiene(isoprene), 2,3-dimethyl-1,3-butadiene, 1,3-pentadiene or 1,3-hexadiene, and particularly preferred is 1,3-butadiene or isoprene.

The block copolymer to be used in the present invention can be produced by polymerizing monomers of a vinyl aromatic hydrocarbon and a conjugated diene in a dehydrated organic solvent, by using an organic lithium compound as an initiator, and if necessary, in the coexistence of a randomization agent. As the organic solvent, an aliphatic hydrocarbon such as butane, pentane, hexane, isopentane, heptane, octane or isooctane, an alicyclic hydrocarbon such as cyclohexane, methylcyclohexane or ethylcyclohexane, or an aromatic hydrocarbon such as benzene, toluene, ethylbenzene or xylene may, for example, be used.

The organic lithium compound is a compound having at least one lithium atom bonded in the molecule, and for example, a monofunctional organic lithium compound such as ethyllithium, n-propyllithium, n-butyllithium, sec-butyllithium or tert-butyllithium may be used.

As the randomization agent, tetrahydrofuran (THF) is mainly employed, but other ethers, amines, thioethers, phosphoramides, alkylbenzenesulfonates, or potassium or sodium alkoxides may, for example, be also used. Ethers include, in addition to THF, dimethyl ether, diethyl ether, diphenyl ether, diethylene glycol dimethyl ether and diethylene glycol dibutyl ether. As the amines, tertiary amines such as trimethylamine, triethylamine and tetramethylethylenediamine, as well as cyclic amines may, for example, be used. Further, triphenylphosphine, hexamethylphosphoramide, potassium or sodium alkylbenzene sulfonate, or potassium or sodium butoxide may, for example, be also used as the randomization agent.

The amount of such a randomization agent is at most 10 parts by mass, particularly preferably from 0.001 to 8 parts by mass, per 100 parts by mass of all charged monomers. The timing of the addition may be before the initiation of the polymerization reaction or during polymerization. Further, it may be additionally added, as the case requires.

A solution of the block copolymer thus obtained is obtainable in such a manner that the block copolymer is inactivated by the addition of a polymerization terminator such as water, an alcohol or carbon dioxide in an amount sufficient to inactivate the active terminals. As a method for recovering the block copolymer from the block copolymer solution, an optional method may be employed such as a method of pouring such a solution into a poor solvent such as methanol for precipitation, a method of evaporating a solvent by a heating roll or the like for precipitation (a drum dryer method), a method of concentrating the solvent by a concentrator and then removing a solvent by a bent system extruder, a method of dispersing the solution in water, blowing steam thereinto to heat and remove the solvent (a steam stripping method).

The tubular forming material of the present invention can be obtained in such a manner that thus obtained block copolymers (i), (ii) and (iii), and an additive is further mixed thereto as the case requires to prepare a block copolymer composition. As the method for mixing, a method of melt-kneading isolated block copolymers with one another, or a method of blending the solutions of the block copolymers with one another, followed by removing the solutions by the above method may, for example, be mentioned.

As one of the above additives, a heat stabilizer for preventing heat deterioration, and a phenol type antioxidant such as 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate or n-octadecyl 3-(4-hydroxy-3,5-di-tert-butylphenyl)propionate, or a phosphorus type antioxidant such as 2,2-methylenebis(4,6-di-tert-butylphenyl)octylphosphite or tris(2,4-di-tert-butylphenyl)phosphite may be used.

Further, as another additive, a weather resistance-improving agent, a blocking-preventing agent, an antistatic agent or a lubricant may, for example, be mentioned, and they may respectively be used in combination to the extent that it does not degrade the performance of the tubular forming material of the present invention. As the lubricant, for example, a fatty acid amide, ethylene bis fatty amide, a diglycerin fatty acid ester, a sorbitan mono fatty acid ester, a saturated fatty acid ester of an aliphatic alcohol, a pentaerythritol fatty acid ester or hydrocarbon type wax may be mentioned.

As a weather resistance-improving agent, a benzotriazole type ultraviolet-ray absorber such as 2-(2H-benzotriazol-2-yl)-4,6-bis(1-methyl-1-phenylethyl)phenol or a benzophenone type ultraviolet ray-absorber such as 2,4-di-tert-butyl-4-n-octoxybenzophenone, or a hindered amine type weather resistance-improving agent such as tetrakis(2,2,6,6-tetramethyl-4-piperidyl)-1,2,3,4-butanecarboxylate may, for example, be used. Further, white oil or silicone oil may, for example, be added thereto.

These additives are contained preferably in an amount within a range of at most 5 mass % in the block copolymer composition.

As the case requires, the tubular forming material of the present invention may further contain a vinyl aromatic hydrocarbon polymer in addition to the block copolymer composition, but the content of the vinyl aromatic hydrocarbon polymer is at most 30 parts by mass, preferably from 1 to 10 parts by mass based on 100 parts by mass of the block copolymer composition. If such a content exceeds 30 parts by mass, it is difficult to achieve a desired stretching ratio.

As a vinyl aromatic hydrocarbon polymer, high impact polystyrene, a vinyl aromatic hydrocarbon-(meth)acrylate and/or (meth)acrylic acid copolymer may be mentioned. In order to improve the blocking property of a heat-shrinkable film obtainable, it is preferred to blend high impact polystyrene thereinto. The blend ratio is at most 30 parts by mass, preferably from 0.5 to 10 parts by mass, more preferably from 1 to 5 parts by mass, based on 100 parts by mass of the block copolymer composition. In order to improve the processability or the low-temperature stretchability, it is possible to use a vinyl aromatic hydrocarbon-(meth)acrylate and/or (meth)acrylic acid copolymer in combination, and its blend ratio is preferably from 5 to 30 parts by mass, more preferably from 10 to 25 parts by mass, based on 100 parts by mass of the block copolymer resin composition.

The tubular forming material of the present invention is an optimum material for a tubular method, but it is possible to process this material into a variety of formed products by a commonly known methods such as injection molding, extrusion molding, compression molding or vacuum molding in addition to the tubular method.

EXAMPLES

Now, the present invention will be described in detail. However, it should be understood that the present invention is by no means restricted by such Examples.

Reference Example 1

490 kg of cyclohexane was charged into a reactor. Then, 35.7 kg of a styrene monomer was added thereto, and 1,600 mL of n-butyllithium (a 10 mass % cyclohexane solution) was added thereto at an internal temperature of 30° C. with stirring to carry out polymerization. The internal temperature was decreased to 40° C., and 69.3 kg of a styrene monomer and 8.9 kg of a butadiene monomer were simultaneously added thereto to carry out polymerization sufficiently.

Then, the internal temperature was adjusted to 60° C., and 26.8 kg of butadiene and 69.3 kg of styrene were simultaneously added thereto to carry out polymerization sufficiently.

Reference Example 2

500 kg of cyclohexane was charged into a reactor. Then, 8.0 kg of a styrene monomer was added thereto, and 1,280 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 110.0 kg and a butadiene monomer in a total amount of 13.4 kg, were simultaneously added at constant rates of 87.8 kg/hr and 10.7 kg/hr, respectively, and after completion of the addition, the system was maintained as it was, for a sufficient time. After butadiene gas was completely consumed, 18.6 kg of butadiene was simultaneously added thereto at an internal temperature of 75° C., and the polymerization was continuously carried out.

Then, 50.0 kg of a styrene monomer was simultaneously added thereto to complete the polymerization.

Reference Example 3

500 kg of cyclohexane was charged into a reactor. Then, 4.0 kg of a styrene monomer was added thereto, and 1,950 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 119.0 kg and a butadiene monomer in a total amount of 11.8 kg, were simultaneously added thereto at constant rates of 100.8 kg/hr and 10.0 kg/hr, respectively, and after completion of the addition, the system was maintained as it was, for a sufficient time.

After butadiene gas was completely consumed, 36.4 kg of butadiene was added thereto all at once at an internal temperature of 70° C., and polymerization was continuously carried out. Further, 28.8 kg of a styrene monomer was simultaneously added thereto to complete the polymerization.

Reference Example 4

500 kg of cyclohexane was charged into a reactor. Then, 8.0 kg of a styrene monomer was added thereto, and 2,400 mL of n-butyllithium (a 10 mass % cyclohexane solution) was added thereto at an internal temperature of 30° C. with stirring to carry out the polymerization. While the internal temperature was maintained at 80° C., a styrene monomer in a total amount of 114.0 kg and a butadiene monomer in a total amount of 9.4 kg, were simultaneously added at constant rates of 121.3 kg/hr and 10.0 kg/hr, respectively, and after completion of the addition, the system was maintained as it was, for a sufficient time.

After butadiene gas was completely consumed, 60.6 kg of butadiene was simultaneously added thereto at an internal temperature of 50° C. to continue the polymerization. Further, 8.0 kg of a styrene monomer was simultaneously added thereto to complete the polymerization.

Reference Example 5

500 kg of cyclohexane was charged into a reactor. Then, 80.0 kg of a styrene monomer was added thereto, and 1,530 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 38.0 kg and a butadiene monomer in a total amount of 13.4 kg were simultaneously added thereto at constant rates of 76.0 kg/hr and 26.8 kg/hr, respectively, and after completion of the addition, the system was maintained as it was for a sufficient time.

After butadiene gas was completely consumed, 18.6 kg of butadiene was simultaneously added thereto at an internal temperature of 75° C. to continue the polymerization. Further, 50.0 kg of a styrene monomer was simultaneously added thereto to complete the polymerization.

Reference Example 6

500 kg of cyclohexane was charged into a reactor. Then, 8.0 kg of a styrene monomer was added thereto, and 2,280 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 124.0 kg and a butadiene monomer in a total amount of 11.0 kg were simultaneously added thereto at constant rates of 112.7 kg/hr and 10.0 kg/hr, respectively, and after completion of the addition, the system was maintained as it was for a sufficient time.

After butadiene gas was completely consumed, 49.0 kg of butadiene was simultaneously added thereto at an internal temperature of 70° C. to continue the polymerization. Further, 8.0 kg of a styrene monomer was simultaneously added thereto to complete the polymerization.

Reference Example 7

500 kg of cyclohexane was charged into a reactor. Then, 4.0 kg of a styrene monomer was added thereto, and 1,690 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 118.6 kg and a butadiene monomer in a total amount of 13.4 kg, were simultaneously added at constant rates of 106.2 kg/hr and 12.0 kg/hr, respectively, and after completion of the addition, the system was maintained as it was for a sufficient time.

After butadiene gas was completely consumed, 30.0 kg of butadiene was simultaneously added thereto at an internal temperature of 70° C. to continue the polymerization. Then, 34.0 kg of a styrene monomer was simultaneously added thereto to complete the polymerization.

Reference Example 8

500 kg of cyclohexane was charged into a reactor. Then, 4.0 kg of a styrene monomer was added thereto, and 1,410 mL of n-butyllithium (a 10 mass % cyclohexane solution) was added thereto at an internal temperature of 30° C. with stirring to carry out polymerization. While the internal temperature was maintained at 80° C., a styrene monomer in a total amount of 116.8 kg and a butadiene monomer in a total amount of 15.2 kg were simultaneously added at constant rates of 92.2 kg/hr and 12.0 kg/hr, respectively, and after completion of the addition, the system was maintained as it was for a sufficient time.

After butadiene gas was completely consumed, 30.0 kg of butadiene was simultaneously added thereto at an internal temperature of 75° C. to continue the polymerization. Further, 34.0 kg of a styrene monomer was simultaneously added thereto to complete the polymerization.

Reference Example 9

293 kg of cyclohexane was charged into a reactor. Then, 1,030 mL of n-butyllithium (a 10 mass % cyclohexane solution) was added thereto at an internal temperature of 30° C., and 15.9 kg of a styrene monomer was added thereto with stirring to carry out polymerization.

Further, 55.7 kg of a styrene monomer and 25.3 kg of a butadiene monomer were simultaneously added thereto at an internal temperature of 35° C. to complete the polymerization.

Reference Examples 10 to 17

The block copolymers in Reference Examples 10 and 11 are prepared with reference to Reference Example 1, respectively, the block copolymers in Reference Examples 12 and 13 were prepared with reference to Reference Example 2, respectively, the block copolymer in Reference Example 14 was prepared with reference to Reference Example 9, and the block copolymer in Reference Example 15 was prepared with reference to Reference Example 5. In Reference Example 16, a general-use PVC resin for films was used, and in Reference Example 17, a general-use PP resin for films was used.

The features of the block copolymers in Reference Examples 1 to 17 thus obtained are shown in Tables 1 to 4.

The block copolymers in Reference Examples 1 to 17 were melt-kneaded in blend ratios shown in Tables 5 and 6 at 200° C. for from 0.03 to 0.05 hour by using a single screw extruder (40 mm ϕ extruder, manufactured by Tabata Industrial Machinery Co., Ltd.) to obtain tubular forming materials shown in Examples 1 to 10 and Comparative Examples 1 to 10.

<Measurement of Uniaxial Elongation Viscosity>

The uniaxial elongation viscosity of the tubular forming material for calculating [inclination between two points: S] shown in each of Examples and Comparative Examples was measured by the device and under the conditions as mentioned below. As a sample to be sued for the measurement, one having a tubular forming material melted into a cylindrical shape with a diameter of 1 mm was used.

Measurement device: Meissner model Melten Rheometer, manufactured by Toyo Seiki Seisaku-sho, Ltd.

Oil used: SRX310, manufactured by Dow Corning Toray Silicone Co., Ltd.

Measurement condition: Constant strain rate elongation, elongation strain rate: 0.5 [sec$^{-1}$]

Measurement temperature: 88° C.

The measurement results of the uniaxial elongation viscosity were plotted by taking elongation time [sec] from the initiation of measurement as an abscissa axis and common logarithm (LOG) of the uniaxial elongation viscosity [Pa·sec] as an ordinate axis. Then, uniaxial elongation viscosities at 1.0 sec and 2.8 sec after initiation of the elongation were calculated respectively, the inclination S between the two points was calculated in accordance with the following formula and shown as "inclination between two points: S" in Tables 5 and 6.

$$S=(LOG\ \eta_{2.8}-LOG\ \eta_{1.0})/(2.8-1.0)$$

Then, the tubular forming material in each of Examples and Comparative Examples, which contains a composition comprising block copolymers (i), (ii) and (iii) in a blend ratio shown in Table 5 and Table 6, was subjected to a film forming test in accordance with the following method by using a tubular film formation device (MCE-50, manufactured by YI-CHEN K.K.) adapting an elongation preheating system by using a usual water bath, and its conditions were observed and the heat-shrinkable film obtained was evaluated by the following method, and the results are shown in Table 5 and Table 6.

(1) The tubular forming material having a blend ratio shown in each of Tables 5 and 6 was charged into an extruder, and melt-kneaded at 200° C. so as to be plasticized sufficiently, followed by discharging it into a tube. Subsequently, air was injected into the tube, and further the tube was cooled by blowing an ordinary-temperature wind from the outside of the tube to obtain an optional tube diameter (hereinafter referred to as "tube A").

(2) The tube was rolled up by a roll, then passed through a hot water bath at 88° C. to carry out stretch-preheating, and then air was injected thereto again and expanded until the tube was sufficiently contacted with a cooling ring for fixing size (hereinafter, such a ring is referred to as "sizing ring") in the direction of a tube diameter so that the tube would have an optional tube diameter, whereby a bubble was formed (hereinafter such an operation is referred to as "sizing").

(3) A film after the formation of the bubble was taken up to obtain a heat-shrinkable film.

The film formation stability was evaluated by adjusting the diameter of tube A so that the stretching ratio in the direction of a tube diameter (hereinafter referred to as "TD") would be two times, in accordance with the following calculation formula:

$$TD\ stretching\ ratio\ (times) = \frac{circumference\ of\ bubble\ (cm)}{circumference\ of\ tube\ A\ (cm)}$$

$$= \frac{inner\ circumference\ of\ sizing\ ring\ (cm)}{circumference\ of\ tube\ A\ (cm)}$$

The film formation stability was evaluated in accordance with the following standards.

(1) Stability at the Time of Air Injection

The film formation stability at the time of injecting air into a bubble was evaluated in accordance with the following standard.

A bubble stably reaches the sizing ring: ○

A bubble does not reach the sizing ring since a tube is excessively inflated or burst: ×

(2) Number of Burst of Tube

The TD stretching ratio was set to be double, and the number of burst of bubbles was measured when air was stationary blown for 1 hour under a sizing state.

0: ○

1: Δ at least two times or a case where a bubble could not reach a sizing ring: ×

<Measurement of Heat Shrinkage>

The heat shrinkage of a heat-shrinkable film was measured by the following method.

From a stretched film, a square-shape test specimen having a length of about 100 mm in the film flowing direction (hereinafter referred to as "MD") and a length of 100 mm in TD was cut out. The test specimen was immersed in a hot water having a temperature of 100° C. for 10 seconds and taken it out, then immediately cooled with water to wipe out moisture and then the length L1 (mm) in MD and the length L2 (mm) in TD of the test specimen were measured. The heat shrinkage was calculated by the following formula.

Heat shrinkage (%) in $MD=\{(100.0-L1)/100.0\}\times 100$

Heat shrinkage (%) in $TD=\{(100.0-L2)/100.0\}\times 100$

From the results in Table 5 and Table 6, it is found that the tubular forming material of the present invention is stable in bubble formation, and therefore it is possible to obtain a heat-shrinkable film excellent in the heat shrinkage characteristics.

On the other hand, in the case of Comparative Examples 1 to 3 and 5 to 10 in which "inclination between two points: S" is outside the range defined in the present invention, the stability of bubble formation is totally insufficient, and it was impossible to even carrying out the recovering of a film.

Comparative Example 4 in Table 6 is within the technical range of Patent Document 2, and even when the present invention is compared with Comparative Example 4, it is found that the tubular forming material of the present invention is superior in number of burst of a tube.

TABLE 1

|  |  | Reference Example 1 | Reference Example 10 | Reference Example 11 |
|---|---|---|---|---|
| Type of block copolymer | | (i) | (i) | (i) |
| Structure of block copolymer | | S1-T1-T2 | S1-T1-T2 | S1-T1-T2 |
| Condition a) | St/Bd of T1 (mass % ratio) | 89/11 | 83/17 | 91/9 |
| | St/Bd of T2 (mass % ratio) | 72/28 | 83/17 | 75/25 |
| Condition b) | Proportion of St in S1 (mass %) | 100 | 100 | 100 |

TABLE 2

|  |  | Reference Example 2 | Reference Example 12 | Reference Example 13 |
|---|---|---|---|---|
| | Type of block copolymer | (ii) | (ii) | (ii) |
| | Structure of block copolymer | S1-R1-B1-S2 | S1-R1-B1-S2 | S1-R1-B1-S2 |
| Condition c) | St/Bd in R1 (mass % ratio) | 89/11 | 92/8 | 78/22 |
| Condition d) | Proportion of St in S1 (mass %) | 100 | 100 | 100 |
| | Proportion of S1 based on the total of block copolymer (mass %) | 4 | 4 | 2 |
| | Proportion of St in S2 (mass %) | 100 | 100 | 100 |
| | Proportion of S2 based on the total of block copolymer (mass %) | 25 | 4 | 4 |
| Condition e) | Proportion of Bd in B1 (mass %) | 100 | 100 | 100 |
| | Proportion based on the total of block copolymer (mass % ratio) | 9 | 12 | 7 |

TABLE 3

|  | Reference Example 3 | Reference Example 4 | Reference Example 6 | Reference Example 7 | Reference Example 8 |
|---|---|---|---|---|---|
| Type of block copolymer | (iii) | (iii) | (iii) | (iii) | (iii) |
| Structure of block copolymer | S1-R1-B1-S2 | S1-R1-B1-S2 | S1-R1-B1-S2 | S1-R1-B1-S2 | S1-R1-B1-S2 |
| St/Bd in R1 (mass % ratio) | 91/9 | 92/8 | 92/8 | 90/10 | 88/12 |
| Proportion of St in S1 (mass %) | 100 | 100 | 100 | 100 | 100 |
| Proportion of S1 based on the total of block copolymer (mass %) | 2 | 4 | 4 | 2 | 2 |
| Proportion of St in S2 (mass %) | 100 | 100 | 100 | 100 | 100 |
| Proportion of S2 based on the total of block copolymer (mass %) | 14 | 4 | 4 | 17 | 17 |
| Proportion of Bd in B1 (mass %) | 100 | 100 | 100 | 100 | 100 |
| Proportion of B1 based on the total of block copolymer (mass %) | 18 | 30 | 25 | 15 | 15 |
| St/Bd in T1 (mass % ratio) | — | — | — | — | — |

TABLE 4

|  | Reference Example 5 | Reference Example 9 | Reference Example 14 | Reference Example 15 | Reference Example 16 | Reference Example 17 |
|---|---|---|---|---|---|---|
| Type of block copolymer | | | | | PVC | PP |
| Structure of block copolymer | S1-R1-B1-S2 | S1-T1 | S1-T1-S2 | S1-R1-B1-S2 | — | — |
| St/Bd in R1 (mass % ratio) | 74/26 | — | — | 81/19 | — | — |
| Proportion of St in S1 (mass %) | 100 | 100 | 100 | 100 | — | — |
| Proportion of S1 based on the total of block copolymer (mass %) | 40 | 16 | 8 | 50 | — | — |
| Proportion of St in S2 (mass %) | 100 | — | — | 100 | — | — |
| Proportion of S2 based on the total of block copolymer (mass %) | 25 | — | — | 4 | — | — |
| Proportion of Bd in B1 (mass %) | 100 | — | — | 100 | — | — |
| Proportion of B1 based on the total of block copolymer (mass %) | 9 | — | — | 10 | — | — |
| St/Bd in T1 (mass % ratio) | — | 69/31 | 58/42 | — | — | — |

TABLE 5

|  | Type of block copolymer | Block copolymer | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Blend ratio | (i) | Ref. Ex. 1 | 33.3 | 33.3 | 33.3 | 33.3 | — | 33.3 | — | 30 | 26.6 |
| | (i) | Ref. Ex. 10 | — | — | — | — | 33.3 | — | — | — | — |
| | (i) | Ref. Ex. 11 | — | — | — | — | — | — | 33.3 | — | — |
| | (ii) | Ref. Ex. 2 | 33.3 | 33.3 | 33.3 | 33.3 | — | — | 33.3 | 30 | 26.7 |

TABLE 5-continued

| | Type of block copolymer | Block copolymer | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| | (ii) | Ref. Ex. 12 | — | — | — | — | — | 33.3 | — | — | — |
| | (ii) | Ref. Ex. 13 | — | — | — | — | 33.3 | — | — | — | — |
| | (iii) | Ref. Ex. 3 | 33.4 | — | — | — | — | 33.4 | — | 30 | 26.7 |
| | (iii) | Ref. Ex. 4 | — | 33.4 | — | — | — | — | 33.4 | — | — |
| | | Ref. Ex. 5 | — | — | — | — | — | — | — | — | — |
| | (iii) | Ref. Ex. 6 | — | — | — | — | 33.4 | — | — | — | — |
| | (iii) | Ref. Ex. 7 | — | — | 33.4 | — | — | — | — | — | — |
| | (iii) | Ref. Ex. 8 | — | — | — | 33.4 | — | — | — | — | — |
| | | Ref. Ex. 9 | — | — | — | — | — | — | — | — | — |
| | | Ref. Ex. 14 | — | — | — | — | — | — | — | 10 | 20 |
| | | Ref. Ex. 15 | — | — | — | — | — | — | — | — | — |
| | PVC | Ref. Ex. 16 | — | — | — | — | — | — | — | — | — |
| | PP | Ref. Ex. 17 | — | — | — | — | — | — | — | — | — |
| Evaluation | Inclination between two points: S | | 0.32 | 0.29 | 0.32 | 0.32 | 0.30 | 0.31 | 0.31 | 0.29 | 0.31 |
| | Stability of air injection | | ◯ | ◯ | ◯ | ◯ | ◯ | ◯ | ◯ | ◯ | ◯ |
| | Number of burst of tube | | ◯ | ◯ | ◯ | ◯ | ◯ | ◯ | ◯ | ◯ | ◯ |
| | Heat shrinkage (%) in TD | | 51.8 | 50.8 | 51.0 | 50.6 | 49.1 | 50.1 | 50.0 | 52.4 | 50.1 |
| | Heat shrinkage (%) in MD | | 6.8 | 6.5 | 5.7 | 6.7 | 7.8 | 6.5 | 6.1 | 5.5 | 9.6 |

TABLE 6

| | Type of block copolymer | Block copolymer | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|---|
| Blend ratio | (i) | Ref. Ex. 1 | 33.3 | — | — | 65.0 | — | — | — | — | — | — | — |
| | (i) | Ref. Ex. 10 | — | — | — | — | — | 33.3 | — | — | — | — | — |
| | (i) | Ref. Ex. 11 | — | — | — | — | 33.3 | — | — | — | — | — | — |
| | (ii) | Ref. Ex. 2 | — | 33.3 | — | — | — | — | — | — | — | — | — |
| | (ii) | Ref. Ex. 12 | — | — | — | — | — | — | — | — | — | — | — |
| | (ii) | Ref. Ex. 13 | — | — | — | — | — | — | — | — | — | — | — |
| | (iii) | Ref. Ex. 3 | 33.3 | — | — | — | 33.4 | — | — | — | — | — | — |
| | (iii) | Ref. Ex. 4 | — | — | — | — | — | — | — | — | 100 | — | — |
| | | Ref. Ex. 5 | 33.4 | — | 66.7 | — | 33.3 | — | 100 | — | — | — | — |
| | (iii) | Ref. Ex. 6 | — | 16.7 | — | — | — | — | — | — | — | — | — |
| | (iii) | Ref. Ex. 7 | — | — | 33.3 | — | — | 33.4 | — | — | — | — | — |
| | (iii) | Ref. Ex. 8 | — | — | — | — | — | — | — | — | — | — | — |
| | | Ref. Ex. 9 | — | 50.0 | — | 35 | — | 33.3 | — | — | — | — | — |
| | | Ref. Ex. 14 | — | — | — | — | — | — | — | — | — | — | — |
| | | Ref. Ex. 15 | — | — | — | — | — | — | — | 100 | — | — | — |
| | | Ref. Ex. 16 | — | — | — | — | — | — | — | — | — | — | 100 |
| | | Ref. Ex. 17 | — | — | — | — | — | — | — | — | — | 100 | — |
| Evaluation | Inclination between two points: S | | 0.24 | 0.22 | 0.19 | 0.19 | 0.24 | 0.23 | 0.18 | 0.21 | 0.24 | 0.23 | 0.47 |
| | Stability of air injection | | X | X | X | ◯ | X | X | X | X | X | X | ◯ |
| | Number of burst of tube | | X | X | X | Δ | X | X | X | X | X | X | ◯ |
| | Heat shrinkage (%) in TD | | *1 | *1 | *1 | 45.8 | *1 | *1 | *1 | *1 | *1 | *1 | 45.3 |
| | Heat shrinkage (%) in MD | | *1 | *1 | *1 | 7.5 | *1 | *1 | *1 | *1 | *1 | *1 | 4.5 |

*1: A case where it was impossible to recover a film.

INDUSTRIAL APPLICABILITY

The tubular forming material of the present invention is suitable for production of a heat-shrinkable film by means of a tubular method, and such a material is also suitable for production of a heat-shrinkable film by means of a tenter method. However, regardless of formation methods as the above, the heat-shrinkable film obtained from the tubular forming material of the present invention hardly shrinks even when it was stored in an ordinary temperature for a long period, and the film is excellent in anti-natural shrinkage.

The heat-shrinkable film using the tubular forming material of the present invention is particularly preferred for e.g. a heat-shrinkable label or heat-shrinkable cap seal as e.g. a label for bottles, and such a film may be useful as a packaging film or the like.

The entire disclosure of Japanese Patent Application No. 2006-349932 filed on Dec. 26, 2006 including specification, claims and summary is incorporated herein by reference in its entirety.

The invention claimed is:

1. A tubular forming material comprising block copolymers each made of a vinyl aromatic hydrocarbon and a conjugated diene, which has a uniaxial elongation viscosity at 88° C. at a strain rate of 0.5 sec$^{-1}$ satisfying the following formula between 1.0 sec and 2.8 sec after initiation of elongation, $$0.25 < (\mathrm{LOG}\, \eta 2.8 - \mathrm{LOG}\, \eta 1.0)/(2.8 - 1.0) < 0.4$$

wherein η1.0 and η2.8 represent uniaxial elongation viscosities (Pa·sec) at elongation times of 1.0 sec and 2.8 sec, respectively, when measured by a Meissner model elongation viscometer, wherein the composition comprises the following block copolymer (i), block copolymer (ii) and block copolymer (iii), and the blend ratio (mass % ratio) of (i)/(ii)/(iii) is 20 to 40/20 to 40/20 to 40, (i) a block copolymer which is a block copolymer made of a vinyl aromatic hydrocarbon and a conjugated diene, which satisfies the following (a) and (b)

(a) it has two tapered blocks in which the constitution ratio, in monomer units, of the vinyl aromatic hydrocarbon to the conjugated diene continuously changes, and in a case where one of the two tapered blocks is represented as T1 and the other tapered block is represented as T2, the compositional ratio (mass % ratio) of the vinyl aromatic hydrocarbon to the conjugated diene occupied in each tapered block, is 75 to 95/5 to 25 in T1 and 60 to 95/5 to 40 in T2, (b) at least one terminal block of the block copolymer contains the vinyl aromatic hydrocarbon in an amount of at least 95 mass %, (ii) a block copolymer which is a block copolymer made of a vinyl aromatic hydrocarbon and a conjugated diene, which satisfies the following (c), (d) and (e):

(c) it has at least one random block in which the constitution ratio, in monomer units, of the vinyl aromatic hydrocarbon to the conjugated diene is uniform, and further the content ratio (mass % ratio) of the vinyl aromatic hydrocarbon to the conjugated diene in the random block is 60 to 95/5 to 40, (d) at least one terminal of the block copolymer has a block containing at least 95 mass % of the vinyl aromatic hydrocarbon, and the total amount of such a block is from 1 to 30 mass % based on the total amount of the block copolymer (ii), and (e) it has a block made solely of the conjugated diene, and the content proportion of such a block is from 5 to 14 mass % based on the total of the block copolymer (ii), (iii) a block copolymer which is a block copolymer made of a vinyl aromatic hydrocarbon and a conjugated diene, which satisfies the following (f), (g) and (h):

(f) it has at least one random block in which the constitution ratio, in monomer units, of the vinyl aromatic hydrocarbon to the conjugated diene is uniform, and further the content ratio (mass % ratio) of the vinyl aromatic hydrocarbon to the conjugated diene in the random block is 60 to 95/5 to 40, (g) at least one terminal of the block copolymer has a block containing at least 95 mass % of the vinyl aromatic hydrocarbon, and the total amount of such a block is from 1 to 30 mass % based on the total amount of the block copolymer (iii), and (h) it has a block made solely of the conjugated diene, and the content proportion of such a block is from 15 to 35 mass % based on the total of the block copolymer (iii).

2. The tubular forming material according to claim 1, wherein the uniaxial elongation viscosity at 88° C. at a strain rate of 0.5 sec−1 satisfies the following formula between 1.0 sec and 2.8 sec after initiation of elongation, $$0.3 < (\mathrm{LOG}\ \eta 2.8 - \mathrm{LOG}\ \eta 1.0)/(2.8 - 1.0) < 0.4.$$

3. The tubular forming material according to claim 1, wherein the blend ratio (mass % ratio) of (i)/(ii)/(iii) is 25 to 35/25 to 35/25 to 35.

4. A heat-shrinkable film made from the tubular forming material as defined in claim 1, 2 or 3.

* * * * *